United States Patent
Goldman et al.

[19]

[11] Patent Number: 5,821,433
[45] Date of Patent: Oct. 13, 1998

[54] THIN TACTILE SENSORS FOR NIP WIDTH MEASUREMENT

[75] Inventors: Robert Goldman, Evanston; Harry Kropp, Barrington; James E. Doyle; Yei F. Moy, both of Lindenhurst, all of Ill.

[73] Assignee: Breed Automotive Technology, Inc., Lakeland, Fla.

[21] Appl. No.: 872,028

[22] Filed: Jun. 10, 1997

[51] Int. Cl.$^6$ ........................................ G01L 5/00
[52] U.S. Cl. ........................................ 73/862.55
[58] Field of Search .................. 73/862.55, 862.046, 73/865.9, 862.06; 33/784, 618, 501.6

[56] References Cited

U.S. PATENT DOCUMENTS

| | | | |
|---|---|---|---|
| 2,032,584 | 3/1936 | Lengel et al. | 73/862.55 |
| 3,396,577 | 8/1968 | Brackett | 73/862.55 |
| 4,016,756 | 4/1977 | Kunkle | 73/862.55 |

FOREIGN PATENT DOCUMENTS

| | | | |
|---|---|---|---|
| 60-15533 | 1/1985 | Japan | 73/862.55 |
| 60-15534 | 1/1985 | Japan | 73/862.55 |
| 60-183534 | 9/1985 | Japan | 73/862.55 |

*Primary Examiner*—Ronald L. Biegel
*Attorney, Agent, or Firm*—Laff, Whitesel, Conte & Saret, Ltd.

[57] ABSTRACT

A thin, tactile sensor for measuring the width of a contact region between two loaded rollers. The sensor comprises an array of sensing elements disposed between two thin substrates, and including conductive traces to provide electrical connection to external measurement electronics. Relatively thin conductive electrode patterns are disposed transversely with respect to the direction of travel of the sensor through the rollers, and are positioned at predetermined lateral spacings such that activation of selected sensors provides indicia of nip width.

12 Claims, 4 Drawing Sheets

THIN TACTILE SENSORS FOR NIP WIDTH MEASUREMENT

FIELD OF THE INVENTION

This invention relates generally to measurement of width and/or pressure between two loaded rollers and, in particular, to thin force sensor cells arranged appropriately to effect such a measurement.

BACKGROUND OF THE INVENTION

Measurement of nip width is important in printing and copying technologies, and in the manufacture of other products as well, such as paper and laminated products. A nip, as is well-known in the applicable arts, is an area of contact between two loaded rollers. Often, one of the rollers involved will be constructed of relatively hard material, while one will be relatively soft. Acquisition of raw pressure or force data in the nip area has not been considered as useful as is width information, primarily because of the above-mentioned variation in roller hardness.

In the printing industry, one prior art technique for nip width measurement involves testing the nip width for uniform pressure distribution. This is accomplished by inking the rollers, separating them, and placing a sheet of paper between the rollers. The rollers are then brought back into contact, the width of the ink stripe formed on the paper is measured, and any required adjustments are made. The process is repeated until the nip width meets the desired specification.

Accordingly, a need arises for a simple, improved measurement technique that permits direct measurement of nip width and/or pressure without inking or separating the rollers. Direct measurement of nip width would eliminate labor intensive procedures and would substantially reduce calibration time, thus reducing product cost while increasing product quality.

SUMMARY OF THE INVENTION

These needs and others are satisfied by the present invention in which an improved thin tactile sensor is provided for measuring the width of a region between two loaded rollers. The sensor comprises an array of sensing elements disposed between two thin substrates, and including conductive traces to provide electrical connection to external measurement electronics. Relatively thin conductive electrode patterns are disposed transversely with respect to the direction of travel of the sensor through the rollers, and are positioned at predetermined lateral spacings such that activation of selected sensing elements provides indicia of nip width.

Accurate force or pressure readings may also be discerned from electrical measurement of the sensing elements as the sensor traverses the rollers under test. This information may be displayed on an associated hand-held indicator, or by using a personal computer system adapted for the purpose.

Further objects, features and advantages of the present invention will become apparent from the following description and drawings.

DETAILED DESCRIPTION OF THE INVENTION

In accordance with the present invention, a system using thin tactile sensors for roller nip width measurement is described that provides distinct advantages when compared to prior art nip width measurement techniques. The invention can best be understood with reference to the accompanying drawing figures.

Figure 1:
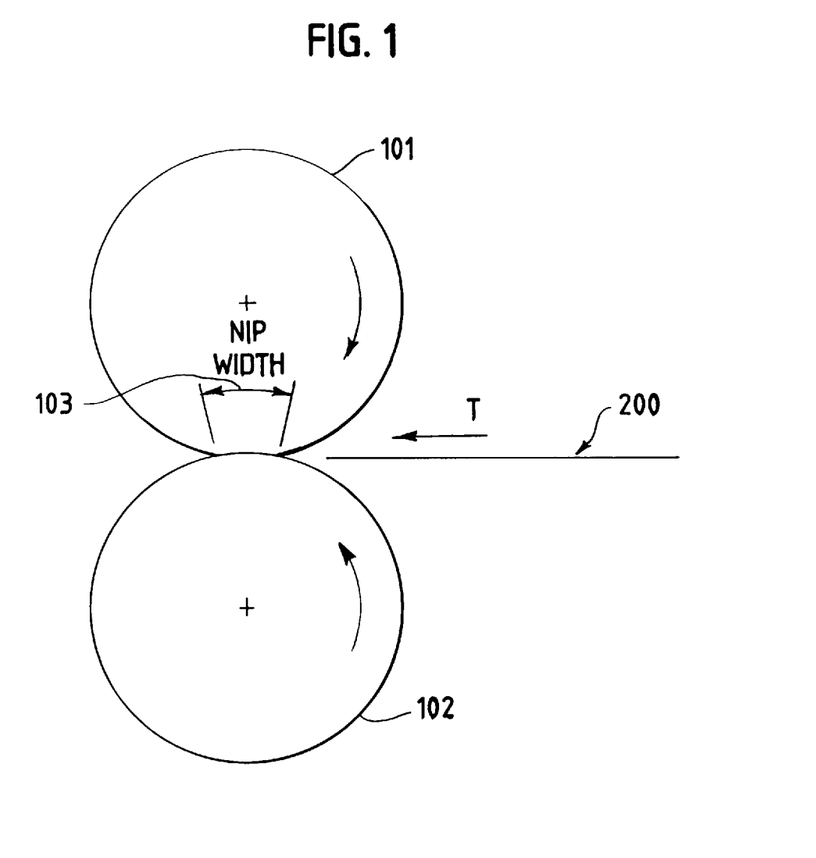
FIG. 1 illustrates two rollers in contact, forming a nip.

The sensor assembly uses a system of thin force sensor cells arranged in a manner to achieve nip width and/or pressure readings between two loaded rollers. FIG. 1 is an illustration of two rollers 101, 102 in contact, forming a nip width 103. Although the rollers may be used for a variety of purposes, when used for distributing ink, a first roller may be formed from a relatively soft material such as rubber, as of Shore A durometer of 25, and a second roller may be of a relatively hard material, such as of a stainless steel material. The nip width 103 is the width of the contact area between a pair of elongated, loaded rollers 101, 102.

Figure 6:
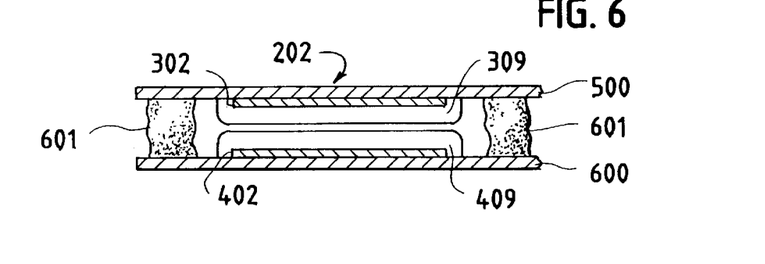
FIG. 6 is a side section view of a portion of the sensor assembly of FIG. 2 taken along section line 6—6.

FIGS. 2 through 5 illustrate a sensor assembly 200 having eight individual sensing elements 201–208 which may be arranged as a sandwich structure between upper and lower substrates (500, 600, respectively). The sensing elements 201–208 are of the general type disclosed in U.S. Pat. Nos. 5,222,399 and 5,086,652. FIG. 6 illustrates the construction of the sensing elements, of which sensing element 202 is illustrative.

The sensing element 202 is disposed between a pair of thin, flexible backing sheets or substrates 500, 600, as of a transparent polyester film material, such as of 0.001 inch duPont Mylar™ polyester film, each of which is provided with a suitable conductive electrode pattern 302, 402. The conductive pattern may be silver deposited from a silver-based ink that may be screen-printed, for example, on the substrates 500, 600. The specific conductive pattern of electrodes is selected for optimum performance in the specific application, and may be relatively thin lines disposed transversely to the direction of travel T of the sensor assembly 200, as shown (see FIG. 1).

A layer of pressure sensitive resistive material 309, 409 is deposited over each of the conductive patterns 302, 402. The pressure sensitive resistive material may be a carbon molybdenum disulfide material in a polyester binder. Other pressure sensitive resistive materials and high temperature thermoplastic binders may be used as well. These regions of pressure sensitive resistive material 309, 409 are interposed between the conductive patterns 302, 402, which are in a confronting relationship. An adhesive material 601 is interposed between the substrates 500, 600 to maintain this confronting relationship between the conductive electrode patterns 302, 402.

Each of the conductive patterns 302, 402 has a conductive lead 502, 602 (FIGS. 2–5) that is also a screen printed silver ink. Each of these conductive leads may be captured by a suitable connector at its end remote from the electrode (not shown) that is used to make convenient electrical contact with external instrumentation. Note that the eight sensing elements 201–208 share one common conductive lead 602 on the lower substrate or backing sheet 600, while on the upper substrate 500, individual conductive leads 501–508 make electrical contact with the electrodes 301–308 of each sensing element. Of course, sensing elements 201–208 may be discrete elements rather than sharing a common electrode.

It can be appreciated that each of the sensing elements 201–208 is a sandwich structure formed when the upper substrate 500 and the lower substrate 600 are brought into a confronting relationship in proper alignment, with pressure sensitive resistive material 309, 409 interposed between confronting conductive regions 302, 402.

Figure 3:
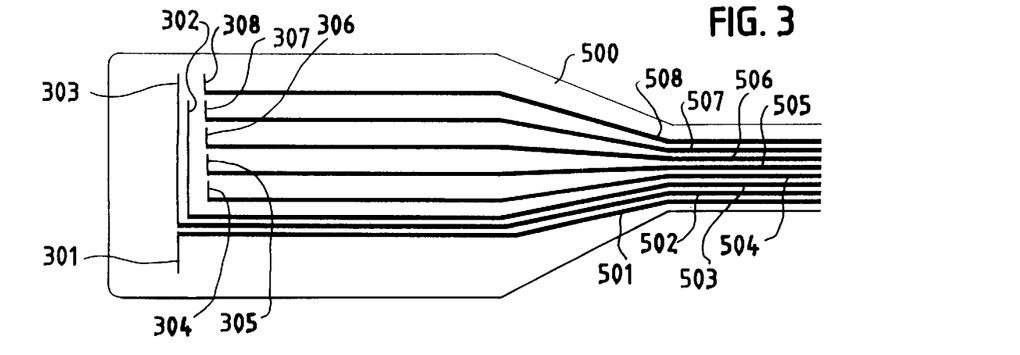
FIG. 3 is a top plan view of the transparent upper substrate of the sensor assembly of FIG. 2, with the conductive pattern on the bottom surface of the upper substrate.
Figure 4:
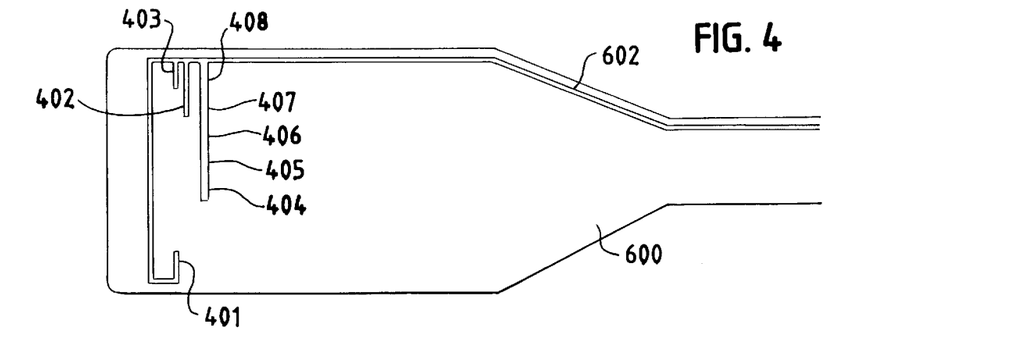
FIG. 4 is a top plan view of the lower substrate of the sensor assembly of FIG. 2 with the conductive pattern on the top surface of the lower substrate.
Figure 5:
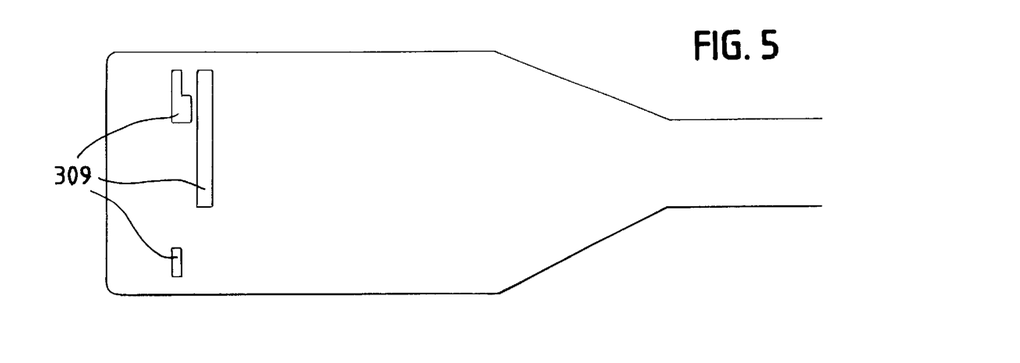
FIG. 5 is a top plan view of the sensor assembly of FIG. 2 showing only the areas where pressure sensitive resistive material is applied between the conductive patterns of the upper and lower substrates.

As noted in the preceding discussion, conductive electrode pattern 302 on the upper substrate 500 overlies conductive electrode pattern 402 on the lower substrate 600, with pressure sensitive resistive material 309,409 interposed therebetween, to form sensing element 202. In similar fashion, conductive electrode pattern 301 on the bottom surface of the upper substrate 500 overlies conductive electrode pattern 401 on the top surface of the lower substrate 600, with interposed pressure sensitive resistive material, to form sensing element 201. Electrode portions 303–308 overlie electrode portions 403–408 (portions 404–408 are part of a relatively wide electrode member), respectively, to form sensing cells 203–208.

Figure 2:
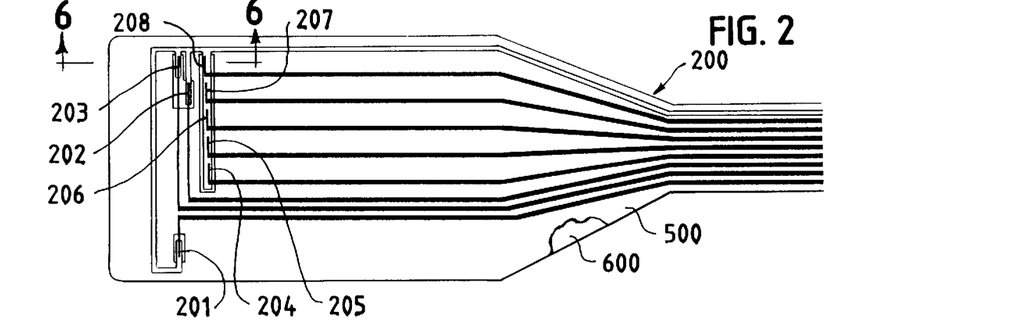
FIG. 2 is a top plan view of a sensor assembly in accordance with the present invention.

The leading edges of sensing elements 201 and 203 are accurately aligned with respect to each other for detection of proper sensor alignment. These are used initially to assure that the sensor assembly is square to the nip edge. Collinear sensing elements 201 and 203, and sensing element 202, define two different starting points, as will be explained, for nip width measurement. Sensing element 202 can also be used for nip pressure or force measurement when it is completely loaded in the sensing area.

As a given sensing element moves into the nip area, the pressure will increase as the actual point of contact between the two rollers is approached. As the sensing element moves past the point of contact, the pressure will increase until the center of the nip is reached. The center of the nip, corresponding to the point of maximum pressure, occurs along the line joining the centers of the two loaded rollers. As the sensing element moves past the center of the nip, the pressure will decrease until, as the sensing element passes the point of contact between the rollers on its way out of the nip area, the sensing element becomes entirely unloaded.

The pressure on the sensing element as it enters the nip area gradually increases to a threshold level at which the resistance of the sensing element in question, an electrically discernible parameter value, decreases sufficiently to provide an "on" indication. As the sensing element moves out of the nip area, and the pressure decreases, the resistance of the sensing element gradually increases to an "off" threshold value.

Sensing elements 204–208 are used as "on" and "off" switches. The electrodes 304–308 are offset or staggered slightly from each other transversely, so that when the sensor assembly 200 is square with the rollers, the electrodes 304–308 enter the nip serially rather than simultaneously. Thus, they may be said to be offset slightly from one another in the direction of movement of the sensor assembly 200 through the nip of the rollers 101, 102 in a fixed or known spatial resolution. The "on" states of these sensing elements 204–208 are progressively determined by the resistance of the pressure sensitive resistive material dropping below a predetermined resistance level at the respective sensing elements.

As the sensor assembly 200 is inserted and moves forward into the nip between the rollers 101, 102, it must be oriented so that sensing elements 201 and 203 are triggered simultaneously. That will ensure proper sensor alignment. As the sensor assembly 200 continues forward into the nip, a force or pressure reading can be obtained when the sensing elements are loaded to a predetermined level at which the resistance drops below a predetermined threshold.

The nip width 103 for a "wide" nip, that is, one in which the contact area of the nip is relatively extensive in the direction of sensor travel, may be determined by advancing the sensor assembly 200 through the nip until sensing elements 201 and 203 turn off, i.e., are unloaded so that their resistance increases above the predetermined threshold. At this precise instant, associated electronics are triggered to observe which ones of the five width sensing elements 204–208 are in an "on" state. The associated electronics are preferably based upon known microprocessor technology. Since elements 204–208 are printed at a known resolution with respect to elements 201 and 203, the nip width can easily be calculated.

For a "narrow" nip, the measurement starting point is deferred to the point where trailing sensing element 202 turns off (is "unloaded"). Just as described above, the sensing elements 204–208 are then scanned to determine which of the sensing elements are in an "on" state. Then, based upon the known spacing between the electrodes 304–308 of the sensing elements 204–208, the nip width is calculated.

The system described provides two different nip width measurement ranges determined by the spacing between collinear elements 201 and 203, and element 202. Other or additional sensing elements or sets of such elements, and other or additional starting point elements can be added for other and additional nip width measurements.

There are a number of fault conditions that can be detected by the associated electronics to indicate that corrective action is required. One such fault condition is detected when all of the sensing elements 204–208 are "on" simultaneously. This indicates that the nip width exceeds, is larger than, the maximum permissible value. On the other hand, if all of the sensing elements 204–208 are "off" simultaneously, the nip width falls below, is less than, the smallest permissible value.

Figure 7:
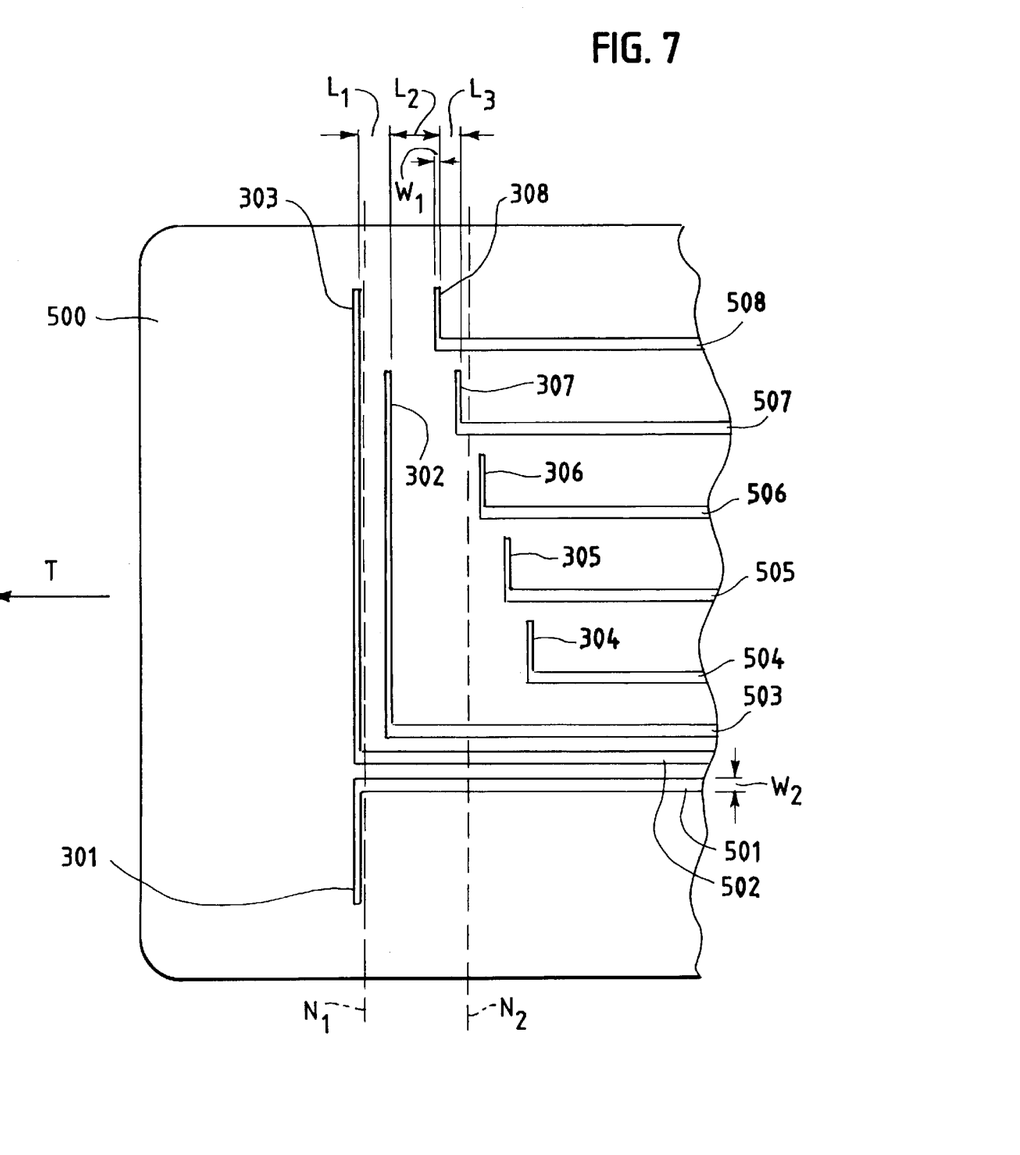
FIG. 7 is a top plan view of a portion of FIG. 3 on an enlarged scale.

FIG. 7 shows a portion of the transparent upper substrate 500 on an enlarged scale, with spacings between conductive electrode patterns 304–308 exaggerated for the purposes of illustration. As discussed previously, conductive traces 501–508 are provided on the upper substrate 500 to permit electrical connection between the conductive electrode patterns 301–308 and a suitable electrical connector. In the preferred embodiment of the invention, each of these conductive traces 501–508 has a width $W_2$ of about 0.060 inch.

The conductive electrode patterns 301–308 preferably have a width $W_1$ of about 0.020 inch. For the embodiment illustrated, the measurement resolution corresponding to the spacing $L_3$ between the staggered nip width measurement sensing elements 304–308 is about 0.010 inch.

The conductive patterns 301, 303 of the leading sensing elements 201, 203 are preferably spaced about 0.12 inch ($L_1$) from the conductive pattern 302, which forms one of the electrodes of secondary start position sensor 202. This distance $L_1$, represents the difference between the two nip width measurement ranges provided in the preferred embodiment.

Conductive electrode pattern 308 is preferably spaced about 0.17 inch behind (in the direction of sensor travel T) the conductive patterns 301, 303 of the leading elements 201, 203. Consequently, the sensor assembly 200 can measure nip widths from about 0.17 inch to about 0.21 inch, with an approximate resolution of 0.01 inch, in the "narrow" range, and from about 0.29 inch to about 0.33 inch in the "wide" range.

The extent of a typical "wide" nip is illustrated in FIG. 7 by demarcation lines $N_1$ and $N_2$. $N_1$ indicates the leading edge of the nip, and is shown at the point where sensing elements 201 and 203 have just become unloaded, as can be appreciated by noting the relative position of $N_1$ and conductive patterns 301 and 303. At this precise instant, the associated electronics scans the width measuring elements 204–208 to determine which elements are in an "on" state. As is apparent from an examination of FIG. 7, since the trailing edge $N_2$ of the nip lies between conductive patterns 306 and 307, corresponding to sensing elements 206 and 207, respectively, the nip width will be calculated as 0.30 inch. Since sensor 308 is loaded, the nip width must be at least 0.29 inch. Sensor 307 is also loaded, so the nip width must correspond to at least 0.30 inch. But sensor 306 is outside the nip so the nip cannot be as wide as 0.31 inch. Thus, within the limits of the 0.01 inch resolution of the system, the nip width is 0.30 inch.

Figure 8:
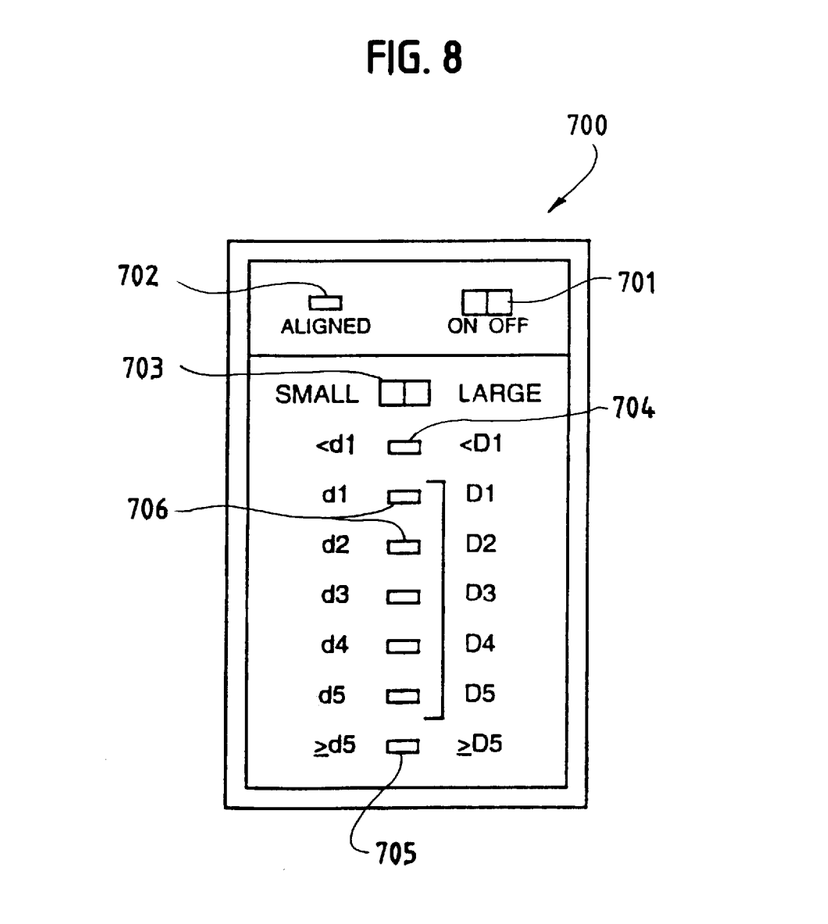
FIG. 8 is a top plan view of a hand-held measuring and indicating device for use with the sensor assembly of FIG. 2.

An electronics system may be used to monitor the sensors system 200 for contact and/or record the time history of the forces that are applied to the sensors. A measurement instrument such as a hand-held, battery-operated electronic device connected to the sensor 200 via standard or custom flex-circuit type connectors may be used, for example. FIG. 8 illustrates a suitable front panel configuration for such a hand-held unit 700.

The hand-held, indicating unit 700 is equipped with an ON/OFF switch 701 for applying power to the internal electronics. Preferably, although the unit 700 is designed for battery operation, an auxiliary power connection (not illustrated) is also provided, although this may be omitted.

A plurality of LED (light emitting diode) indicators displays and provides measured nip width information to the operator. If the leading sensors 201, 203 are properly engaged at the beginning of a nip width test, an appropriate alignment indicator 702 is illuminated.

As discussed above, at least two different nip widths can be accurately characterized by judicious selection of the number of sensor elements and their spacings. Consequently, on the exemplary unit 700, a switch 703 is provided for selecting the appropriate nip width measurement range. If the nip width falls below the minimum value, or exceeds the maximum specification, an appropriate LED (704, 705, respectively) is illuminated to alert the operator.

An array of width indicating LEDs 706 is also provided. As discussed above with reference to the specific sensor cells, if the SMALL nip width were selected by the selector switch 703 (corresponding to the lower case legend d1, d2, etc.), and sensor 208 were in an "on" state at the exact instant when sensor 202 turns "off," then the indicator 706 associated with the d1 legend would be illuminated, signifying to the operator that the nip has a width corresponding to distance d1. If both sensors 207 and 208 were in an "on" state, this would signify slightly larger nip width d2, and the LED corresponding to d2 would be illuminated. When the selector switch 704 is in the LARGE position, the upper case legend (D1, D2, etc.) applies.

It can be appreciated that the hand-held indicating unit 700 can be used to monitor any variety of sensor assemblies as long as associative electrode position is maintained in a consistent manner. A laminated printed overlay may be used to provide users with the appropriate nip width dimensions (d1–d5 and D1–D5, as shown in FIG. 8). As is apparent, these values would change based on the dimensions L1, L2 and L3 (as shown in FIG. 7) for a particular sensor assembly.

A personal computer (PC) system comprising a PC, a high-speed data acquisition and control means or card of known construction installable in the PC, a multiple-channel sensor conditioning module (known in the art) containing one channel for each of the sensors 201–208, sensor connecting cables, sensors and software would allow high speed timing and complete time history recordings of the force levels on each of the several sensors 201–208.

There has been described herein a thin, tactile sensor system for nip width measurement that is relatively free from the shortcomings of the prior art. It will be apparent to those skilled in the art that modifications may be made without departing from the spirit and scope of the invention.

What is claimed is:

1. A method for measuring the nip width in the contact region between a pair of loaded rollers, the method comprising the steps of:

providing a sensing assembly defining a line normal to the direction of travel of the sensing assembly through the contact region between said pair of loaded rollers, said sensing assembly comprising a plurality of sensing elements;

providing at least two of said sensing elements as alignment sensing elements collinearly along said line and providing at least two sensing elements as width sensing elements rearwardly of said alignment sensing elements, and each being disposed a known fixed distance rearwardly from each preceding width sensing element;

establishing a measurement threshold for each said sensing element;

feeding said sensing assembly through the contact region between the two loaded rollers;

detecting measurement events for each said sensing element;

detecting proper alignment of said plurality of width sensing elements by detecting measurement events on at least two collinearly arranged alignment sensing elements simultaneously; and determining the nip width of the contact region based on said detected measurement events.

2. The method of claim 1, and wherein said sensing elements comprise at least one initial sensing element and at least one range sensing element, and further comprising the step of determining the range of the nip width in said contact region by detecting measurement events of at least one said initial sensing element and at least one said range sensing element continuously.

3. The method of claim 1, further comprising the step of detecting a fault condition by detecting measurement events on all of said plurality of sensing elements continuously.

4. The method of claim 1, wherein one or more of the measurement thresholds are based on the rate of change of measured electrical properties of associated sensing elements.

5. The method of claim 1, further comprising the step of comprising a force applied to each said sensing element by the two rollers as each said sensing element is being fed through said contact region.

6. A sensor assembly for measuring the width of a region of contact between two loaded rollers, the sensor assembly comprising:

an array of width sensing elements;

means for establishing a line normal to sensor direction of travel through said region between the rollers;

a plurality of width sensing elements disposed rearwardly of said line, each of said width sensing elements disposed a known fixed distance rearwardly from a first width sensing element and from each preceding width sensing element;

and wherein said sensor assembly further comprises means for electrically connecting said sensing elements to a measuring instrument; means for establishing a measurement event threshold for each said electrically connected sensing element; means for detecting a measurement event for each said electrically connected sensing element; and means for determining the width of the region of contact based on said detected measurement events; and wherein said sensor assembly is configured to travel through the contact region between the two loaded rollers in a sensor assembly direction of travel and said alignment sensing element further comprises at least two sensing elements disposed substantially collinearly along a line normal to said sensor assembly direction of travel, wherein proper alignment is determined by detection of measurement events for all of said at least two sensing elements simultaneously.

7. A sensor assembly for measuring the width of a region of contact between two loaded rollers, the sensor assembly comprising:

an array of width sensing elements;

means for establishing a line normal to sensor direction of travel through said region between the rollers;

a plurality of width sensing elements disposed rearwardly of said line, each of said width sensing elements disposed a known fixed distance rearwardly from a first width sensing element and from each preceding width sensing element;

and wherein said sensor assembly further comprises means for electrically connecting said sensing elements to a measuring instrument; means for establishing a measurement event threshold for each said electrically connected sensing element; means for detecting a measurement event for each said electrically connected sensing element; and means for determining the width of the region of contact based on said detected measurement events; and further comprising means for detecting and signaling fault conditions wherein a fault condition is indicated when the width of the region of contact between the two loaded rollers falls below a predetermined minimum value or exceeds a predetermined maximum value.

8. A sensor assembly for measuring the width of a region of contact between two loaded rollers, the sensor assembly comprising:

an array of width sensing elements;

means for establishing a line normal to sensor direction of travel through said region between the rollers;

a plurality of width sensing elements disposed rearwardly of said line, each of said width sensing elements disposed a known fixed distance rearwardly from a first width sensing element and from each preceding width sensing element;

and wherein said sensor assembly further comprises means for electrically connecting said sensing elements to a measuring instrument; means for establishing a measurement event threshold for each said electrically connected sensing element; means for detecting a measurement event for each said electrically connected sensing element; and means for determining the width of the region of contact based on said detected measurement events; and wherein said means for establishing a measurement event threshold comprises means for establishing an electrically discernible parameter value recognizable by said means for detecting.

9. A sensor assembly for measuring the width of a region of contact between two loaded rollers, the sensor assembly comprising:

an array of width sensing elements;

means for establishing a line normal to sensor direction of travel through said region between the rollers;

a plurality of width sensing elements disposed rearwardly of said line, each of said width sensing elements disposed a known fixed distance rearwardly from a first width sensing element and from each preceding width sensing element;

and wherein said sensor assembly further comprises means for electrically connecting said sensing elements to a measuring instrument; means for establishing a measurement event threshold for each said electrically connected sensing element; means for detecting a measurement event for each said electrically connected sensing element; and means for determining the width of the region of contact based on said detected measurement events; and wherein said sensing elements are thin force sensor cells having upper and lower confronting conductive electrodes and a pressure sensitive resistive material between them such that pressure increases on said sensor cells causes resistance decreases in said sensor cells.

10. A sensor assembly for measuring the width of a region of contact between two loaded rollers, the sensor assembly comprising:

an array of width sensing elements;

means for establishing a line normal to sensor direction of travel through said region between the rollers;

a plurality of width sensing elements disposed rearwardly of said line, each of said width sensing elements disposed a known fixed distance rearwardly from a first width sensing element and from each preceding width sensing element;

and wherein said sensor assembly further comprises means for electrically connecting said sensing elements to a measuring instrument; means for establishing a measurement event threshold for each said electrically connected sensing element; means for detecting a measurement event for each said electrically connected sensing element; and means for determining the width of the region of contact based on said detected measurement events; said sensor assembly further comprising display means for displaying said determined width of the region of contact;

and wherein said display means comprises a series of light emitting diodes, each light emitting diode being associated with a sensing element from said array of sensing elements.

11. A sensor assembly for measuring the width of a region of contact between two loaded rollers, the sensor assembly comprising:

an array of width sensing elements;

means for establishing a line normal to sensor direction of travel through said region between the rollers;

a plurality of width sensing elements disposed rearwardly of said line, each of said width sensing elements disposed a known fixed distance rearwardly from a first width sensing element and from each preceding width sensing element;

and wherein said sensor assembly further comprises means for electrically connecting said sensing elements to a measuring instrument; means for establishing a measurement event threshold for each said electrically connected sensing element; means for detecting a measurement event for each said electrically connected sensing element; and means for determining the width of the region of contact based on said detected measurement events; said sensor assembly further comprising display means for displaying said determined width of the region of contact;

and wherein said display means further comprises an alignment indicator for indicating proper sensor assembly alignment between the two loaded rollers.

12. A sensor assembly for measuring the width of a region of contact between two loaded rollers, the sensor assembly comprising:

an array of width sensing elements;

means for establishing a line normal to sensor direction of travel through said region between the rollers; and a plurality of width sensing elements disposed rearwardly of said line, each of said width sensing elements disposed a known fixed distance rearwardly from a first width sensing element and from each preceding width sensing element; and wherein each said sensing element is a force sensor cell.

* * * * *

UNITED STATES PATENT AND TRADEMARK OFFICE
CERTIFICATE OF CORRECTION

PATENT NO. : 5,821,433
DATED      : October 13, 1998
INVENTOR(S): Goldman et al.

It is certified that error appears in the above-indentified patent and that said Letters Patent is hereby corrected as shown below:

In Claim 12, column 10, line 12 of the Patent, after "between the the rollers", insert ---wherein said alignment sensing element further comprises at least two sensing elements disposed substantially collinearly along a line normal to the sensor direction of travel--.

Signed and Sealed this

Sixteenth Day of March, 1999

Attest:

Q. TODD DICKINSON

Attesting Officer

Acting Commissioner of Patents and Trademarks